United States Patent [19]

Riewerts et al.

[11] 4,379,491

[45] Apr. 12, 1983

[54] LEVELING SYSTEM FOR A WHEELED IMPLEMENT

[75] Inventors: Paul R. Riewerts, Port Byron, Ill.; Stephen M. Hillman, Mesa, Ariz.

[73] Assignee: Deere & Company, Moline, Ill.

[21] Appl. No.: 246,758

[22] Filed: Mar. 23, 1981

[51] Int. Cl.³ .......................................... A01B 59/042
[52] U.S. Cl. .................................... 172/328; 172/456
[58] Field of Search ............................. 172/328, 396; 280/414.5, 43.23

[56] References Cited

U.S. PATENT DOCUMENTS

| | | | |
|---|---|---|---|
| 2,641,886 | 6/1953 | Graham | 55/93 |
| 2,985,247 | 5/1961 | Oehler et al. | 172/413 |
| 3,082,830 | 3/1963 | McKay | 172/328 |
| 3,734,199 | 5/1973 | Tsuchiya et al. | 172/551 |
| 3,809,165 | 5/1974 | Miller | 172/328 |
| 3,912,017 | 10/1975 | Rehn | 172/328 |
| 3,912,018 | 10/1975 | Brundage et al. | 172/328 |
| 4,148,362 | 4/1979 | Orth | 172/22 |

Primary Examiner—George J. Marlo

[57] ABSTRACT

A leveling system for a wheeled implement wherein the implement includes a frame with ground-engaging tools, a forwardly extending hitch structure, support wheels mounted to the frame, and wheel lift cylinders attached between the frame and the support wheels for raising or lowering the frame relative to the ground. The leveling system includes a fore-and-aft leveling mechanism and a controller. The fore-and-aft leveling mechanism is attached between the frame and the hitch structure for maintaining the frame substantially parallel to the ground during both transport and working operations. The controller uses a control lever which activates both the wheel lift cylinders and the fore-and-aft leveling mechanism. Movement of the control lever permits the frame and the hitch structure to move relative to the ground so that the frame can remain parallel to the ground at all times, even when the frame is being raised or lowered on the support wheels.

17 Claims, 5 Drawing Figures

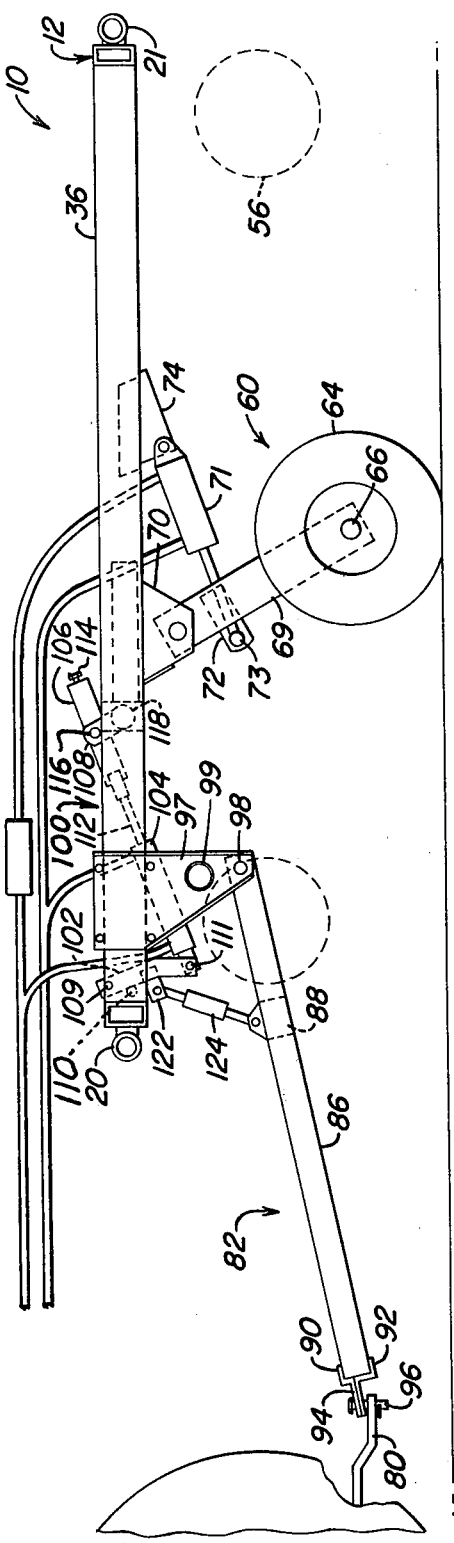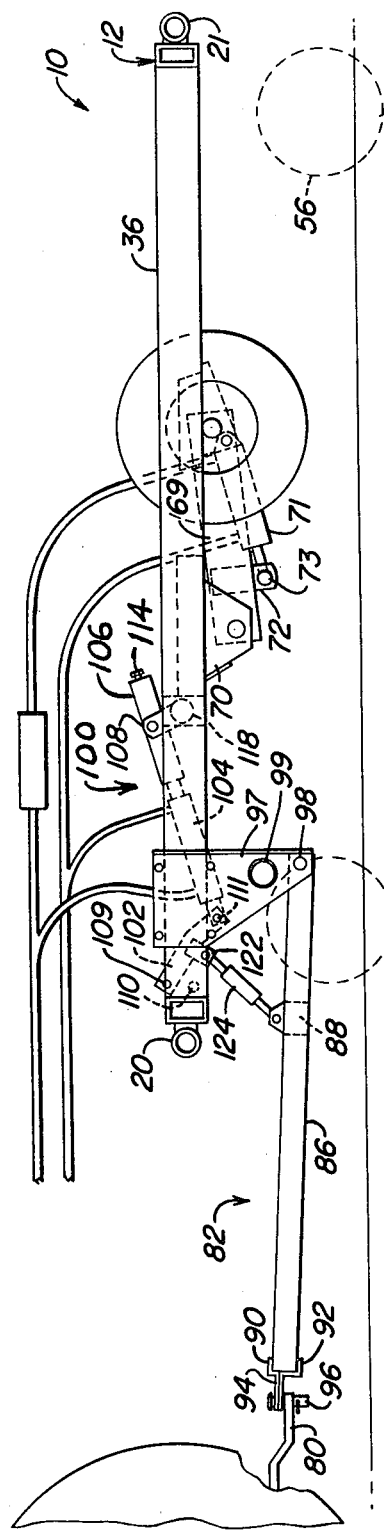
FIG. 2
FIG. 3

LEVELING SYSTEM FOR A WHEELED IMPLEMENT

FIELD OF THE INVENTION

This invention relates to an improved leveling system for an implement and more particularly to an improved leveling system and control circuit for a tractor drawn agricultural implement, such as a disk harrow.

BACKGROUND OF THE INVENTION

Most vehicle drawn implements contain support wheels to raise or lower the implement with respect to the ground. In addition, some sort of fore-and-aft leveling means may be present to retain the implement parallel to the ground while it is being traversed over the ground.

In the past, an adjustable double-acting spring connection has been provided between the frame and the hitch structure of the implement to provide a means for varying the fore-and-aft weight distribution and also to accommodate a limited range of relative movement between the hitch and the frame. Such a construction is shown in U.S. Pat. No. 2,985,247, issued to W. P. Oehler et al. on May 23, 1961. A second method of leveling an implement relative to the ground included the use of a cylinder and spring arrangement as shown in U.S. Pat. No. 3,912,017, issued to Gary A. Rehn on Oct. 14, 1975. In the Rehn patent, mechanical adjusting means were provided wherein the operator would be required to leave the confinement of the vehicle and manually adjust the leveling mechanism on the implement by using hand tools. Furthermore, the lift wheels on the implement were attached to the frame by drop axles. In this design, a single hydraulic cylinder was used to activate all of the drop axles which were positioned horizontally on the elongated implement frame. The movement of the drop axles mechanically activated the raising or lowering of the lift wheels.

Neither of these methods or any other available leveling system provides on-the-go leveling features. Further, they require manual adjustment, necessitating the need for hand tools. This is particularly a frequent problem when an agricultural implement is used in fields having different soil conditions. Furthermore, the use of drop axles on the frame of a disk harrow creates a nuisance in that the debris of past crops and the newly turned over soil tends to cling onto the drop axles. This buildup of crop residue hinders the mechanical actuation of the drop axles and prevents the rotation of the disks themselves. Now, an improved leveling system and control circuit has been invented which will eliminate these aforementioned problems.

SUMMARY OF THE INVENTION

Briefly, this invention relates to an improved leveling system and control circuit for an implement. The implement includes a frame adapted to support ground-engaging tools, a hitch structure pivotally connected to the frame, support wheels mounted to the frame, and wheel lift cylinders attached between the frame and the support wheels for raising or lowering the frame relative to the ground. The improved leveling system includes a fore-and-aft leveling means attached between the frame and the hitch structure for maintaining the frame substantially parallel to the ground during both transport and working operations and a control means. The control means joins the wheel lift cylinders and the fore-and-aft leveling means to a control lever, preferably mounted in the vehicle. Actuation of the control lever permits the frame and the hitch structure to move relative to the ground so that the frame can remain parallel to the ground even when the frame is being raised or lowered on the support wheels.

The general object of this invention is to provide an improved leveling system and control circuit for a vehicle drawn implement. A more specific object of this invention is to provide a hydraulically activated, leveling system and control circuit for a tractor drawn agricultural implement.

Another object of this invention is to provide an improved leveling system for a tractor drawn implement which will provide on-the-go adjustment features.

Still another object of this invention is to provide an improved leveling system for a disk harrow or the like which eliminates the need for manually adjusting the implement for different soil conditions.

A further object of this invention is to provide an improved leveling system for a disk harrow or the like which does away with the necessity of drop axles.

Still further an object of this invention is to provide a control circuit which integrates movement of the wheel lift cylinders with the movement of the fore-and-aft leveling cylinder thereby controlling the lifting and leveling of an implement.

Other objects and advantages of the present invention will become more apparent to those skilled in the art in view of the following description and the drawings.

BRIEF DESCRIPTION OF THE DRAWINGS

FIG. 2 is a left side elevational view of the disk harrow shown in FIG. 1, with the disk harrow being shown in its raised or transport position.

FIG. 3 is a view similar to FIG. 2 but showing the disk harrow in its lowered or working position.

DETAILED DESCRIPTION OF THE PREFERRED EMBODIMENT

Figure 1:
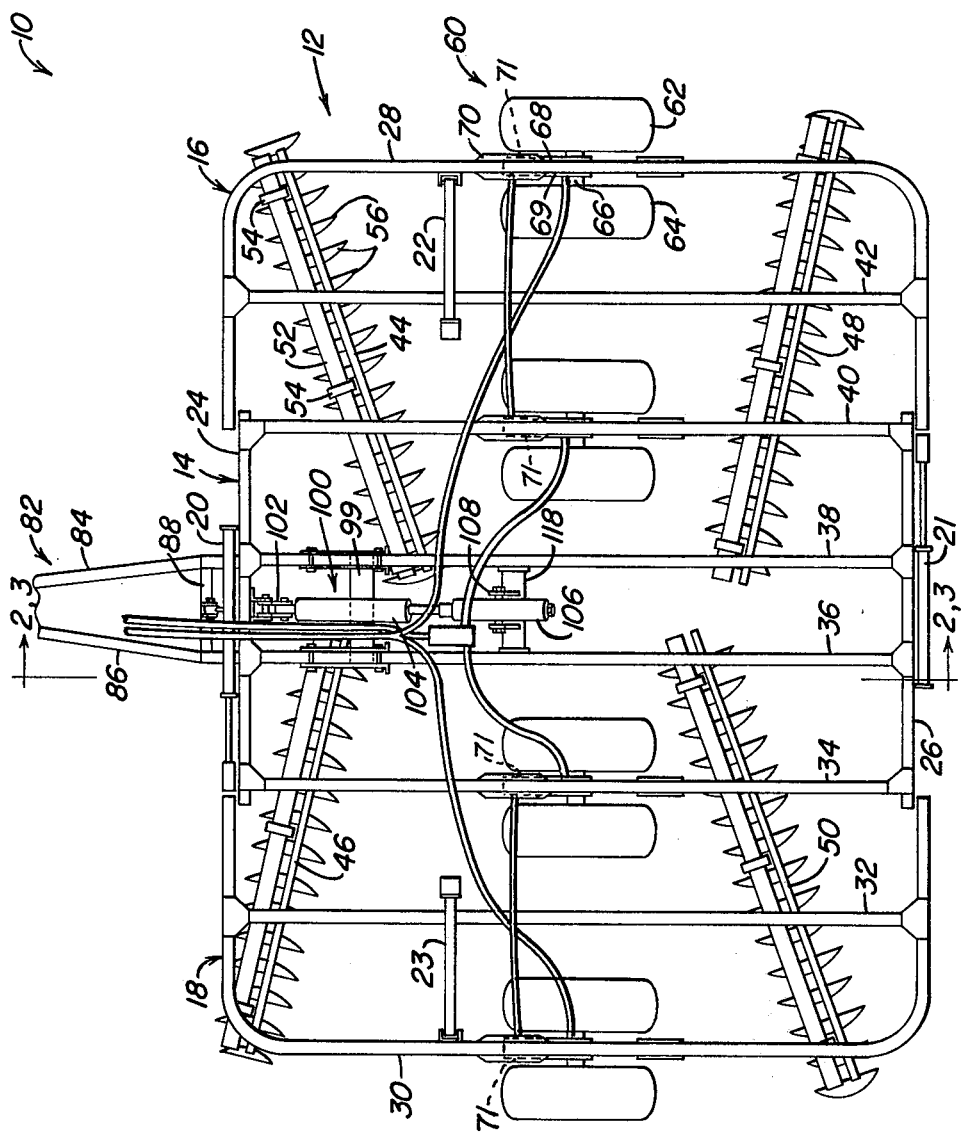
FIG. 1 is a top view of a disk harrow incorporating the improved leveling system of this invention.

Referring now to FIGS. 1-3, a disk harrow 10 is illustrated having a frame 12 constructed of a structural tube formed in the shape of a rectangle with rounded corners. The frame 12 is depicted as a flexible three-part member consisting of a main section 14, a right wing section 16 and a left wing section 18. Although the frame 12 is depicted as a flexible three-part member with folding features provided by hydraulic cylinders 20 and 21, and support bars 22 and 23, the invention will work equally well for rigid one piece frames.

The frame 12 includes transversely extending front and rear ends 24 and 26, respectively, and right and left sides 28 and 30, respectively. Extending lengthwise on the frame 12 are elongated tubular frame sections 32, 34, 36, 38, 40 and 42 which provide reinforcement and support for tool gangs and lift wheels.

Supported beneath the forward end of the frame 12 is a pair of right and left forwardly diverging tool gangs 44 and 46, and supported beneath the rearward end of the frame 12 is a pair of right and left rearwardly diverging tool gangs 48 and 50, respectively. The tools gangs 44, 46, 48 and 50 are of conventional construction with each having an elongated tubular frame 52, a plurality of vertical standards 54 connected at their upper ends to the tubular frame 52, and an elongated gang of disks 56 rotatably supported on the lower end of the vertical standards 54. Each elongated tubular frame 52 is attached to the rectangular frame 12 by bolts, not shown.

The disks 56 can be supported on the frame 12 in a tandem or double-offset arrangement. The double-offset arrangement is fully described in U.S. Pat. No. 3,734,199 issued to Tsuchiya et al. on May 22, 1973 and the working angle on each of the tool gangs 44, 46, 48 and 50 may be fixed or adjustable so as to accommodate different soil conditions.

Two or more wheel modules 60 are rotatably supported on the underside of the frame 12 between the front and rear pairs of tool gangs 44, 46, 48 and 50. Each wheel module 60 includes a pair of ground-engaging wheels 62 and 64 rotatably mounted on an axle 66 and each supported by a support arm 68 and 69, respectively, see FIGS. 2 and 3. Each pair of the support arms 68 and 69 are pivotally connected at their upper ends to brackets 70 which are permanently attached to the right and left sides 28 and 30, respectively, of the frame 12 and to the elongated tubular frame sections 34 and 40, respectively. The number of wheel modules 60 present on an implement will depend upon a variety of factors, including the width of the frame, the weight of the frame and the type of frame.

Preferably, each pair of the support arms 68 and 69 extend downwardly and rearwardly with respect to the frame 12. Movement of the support arms 68 and 69, in order to raise or lower the wheel modules 60 off the ground, is provided by power lifts 71. A preferred power lift 71 is a hydraulic cylinder which is pivotally attached at one end via a connecting bracket 72 and a pin 73 to the support arms 68 and 69. Preferably the point of attachment is near the midpoint of the support arms 68 and 69. The opposite end of each of the hydraulic cylinders 71 is attached to the frame 12 by a bracket 74.

As seen in FIG. 2, the hydraulic cylinder 71 is depicted in its fully extended position wherein each of the wheel modules 60 are in contact with the ground and the disks 56 are raised off the ground. This is referred to as the raised or transport position. In FIG. 3, the hydraulic cylinder 71 is depicted in a retracted position wherein each of the wheel modules 60 are raised up off the ground allowing the disks 56 to be in a working position. For purposes of clarity in FIGS. 2 and 3, the tubular disk frame 52 and the vertical standards 54 have been removed and the disks 56 are shown in phantom.

Turning now to the front end of the frame 12, the disk harrow 10 is connected to a conventional draw bar 80 on an agricultural tractor by means of a hitch structure 82. The hitch structure 82 includes a pair of forwardly converging tube sections 84 and 86, a transverse brace 88 which extends between the coverging tube sections 84 and 86, and a pair of upper and lower plates 90 and 92 which join together to form a tongue 94. The forward end of the tongue 94 is apertured to receive a hitch pin 96 for connecting the hitch structure 82 to the draw bar 80.

The hitch structure 82 is connected to the frame 12 by identical pairs of hitch support plates 97, of which only one plate of one pair is shown. The two pairs of support plates 97 extend downward from the frame 12 and are fastened together by a hollow support tube 99 at the bottom and to opposite sides of the tubular frame sections 36 and 38 at the top. The hitch structure 82 is connected to these support plates 97 by pins 98 which allow for swinging movement of the forward end of the hitch structure 82 about a transverse axis through the pins 98. Each of the pins 98 extend transversely between each pair of the support plates 97 and pivotally support one end of the converging tube sections 84 and 86 therebetween.

A fore-and-aft leveling mechanism 100 is positioned on a front portion of the frame 12 and works in combination with the hitch structure 82 to maintain the frame 12 substantially parallel to the ground at all times. Preferably, the fore-and-aft leveling mechanism 100 is positioned centrally on the disk harrow 10. The fore-and-aft leveling mechanism 100 includes a first support arm 102, a hydraulic cylinder 104, a spring assembly 106 and a second support arm 108. The first support arm 102 is pivotally connected to a front portion of the frame 12 by a pin 109 and is limited in its forward motion by a stop 110. The stop 110 is fixed to the frame 12 and is so located that a rigid link is formed between the frame 12 and the hitch structure 82 when the first support arm 102 is against the stop 110 and when the disk harrow 10 is in the transport position.

The first support arm 102 extends downwardly and rearwardly on the frame 12 and is pivotally joined by a pin 111 to one end of the hydraulic cylinder 104. Extending out of the other end of the hydraulic cylinder 104 is a cylinder rod 112. This cylinder rod 112 is coaxially aligned with and extends into the spring assembly 106. The spring assembly 106 contains a coil spring, not shown, which is held in place by an elongated connecting bolt 114 which is threaded into the cylinder rod 112. The hydraulic cylinder 104, which is preferably a double-acting cylinder, is positioned inline with the spring assembly 106 and both are inclined upwardly and rearwardly by the second support arm 108. This second support arm 108 is pivotally attached at one end to the spring assembly 106 by a pin 116 and is securely attached at the other end by a brace 118. The brace 118 is securely mounted between the tubular frame sections 36 and 38, see FIG. 1.

Also secured to the first support arm 102, by a bracket 122, in an adjustable turnbuckle 124. The adjustable turnbuckle 124 is pivotally attached between the bracket 122 and the traverse brace 88. This turnbuckle 124 is adjustable by the operator after the disk harrow 10 has been attached to the draw bar 80. In the conventional attaching process, the operator will back the tractor up to the disk harrow 10 which is normally resting on the ground as shown in FIG. 3. The operator connects the hitch structure 82 to the draw bar 80 and actuates a control lever in the cab of the tractor to raise the implement up to the transport position, see FIG. 2. While in the transport position, the operator will manually adjust the turnbuckle 124 until the frame 12 is parallel to the ground. This turnbuckle 124 allows the disk harrow 10 to be attached to tractors having draw bars 80 at different vertical heights relative to the ground.

Figure 4:
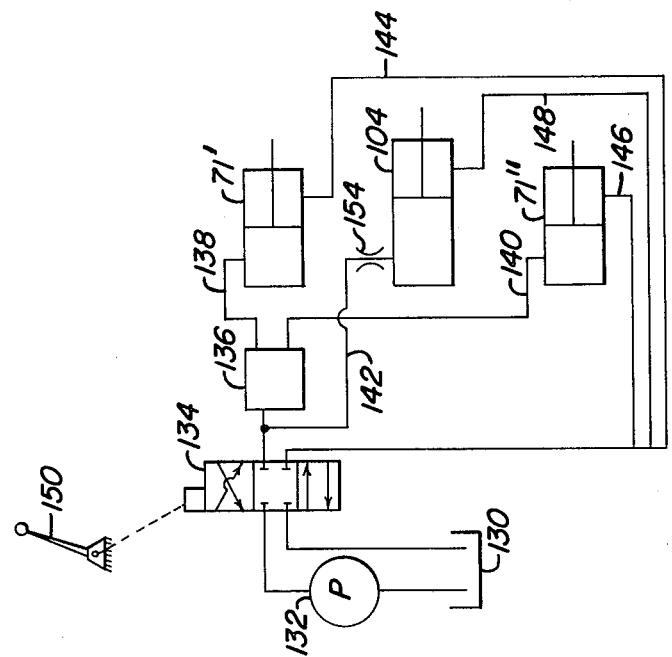
FIG. 4 is a schematic of a control circuit for the lifting and leveling of an implement having two hydraulic lift cylinders and a fore-and-aft leveling cylinder.
Figure 5:
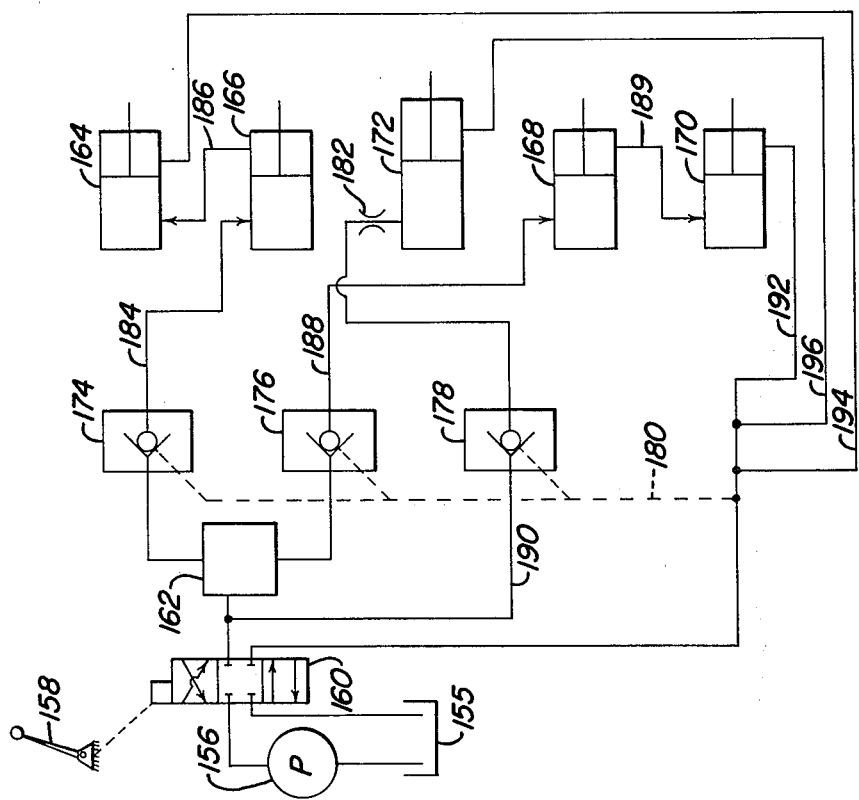
FIG. 5 is a schematic of an alternative control circuit for the lifting and leveling of an implement having a flexible frame with a plurality of hydraulic lift cylinders and a fore-and-aft leveling cylinder.

Referring now to FIGS. 4 and 5, two different embodiments of control circuits are depicted for controlling the operation of the power lifts and the fore-and-aft leveling mechanism so as to maintain the disk harrow 10 substantially parallel to the ground during both the working or transport operation. The control circuit shown in FIG. 4 comprises a reservoir 130, a pump 132, a flow controller 134, such as a selective control valve, a flow divider 136, two hydraulic wheel lift cylinders 71' and 71", a fore-and-aft leveling cylinder 104 all connected together by passages 138, 140, 142, 144, 146 and 148. The passages 138 and 140 connect the flow divider 136 to the wheel lift cylinders 71' and 71" while the passages 142 connects the flow controller 134 to the fore-and-aft leveling cylinder 104. The passages 144, 146 and 148 connect the opposite ends of the wheel lift cylinders 71' and 71" and the fore-and-aft leveling cylinder 104, respectively, to the reservoir 130. Preferably the passages 144, 146 and 148 pass into and through the flow controller 134 so that fluid flow can be reversed. This feature allows the wheel lift cylinders 71' and 71" and the fore-and-aft leveling cylinder 104 to be driven in either direction. The flow controller 134 is operated by a control lever 150. The physical attachment of the control lever 150 to the flow controller 134 is indicated by a dotted line for simplicity only.

In operation, as the control lever 150 is moved in one direction, the flow controller 134 is shifted to an open position and the pressurized fluid from the pump 132 will flow through the flow controller 134. Upon leaving the flow controller 134, the flow is divided into two portions, one portion flowing into the passage 142 and the other portion flowing into the flow divider 136. The flow dividing means 136 can be a conventional flow divider-combiner that divides the flow into equal volumes irrespective of the pressure differentials in the passages 138 and 140. This assures that the pistons within both of the wheel lift cylinders 71' and 71" will move at the same velocity. The piston of the fore-and-aft leveling cylinder 104 is also controlled to move at approximately the same velocity as the pistons in the wheel lift cylinders 71' and 71". This can be accomplished by constructing an orifice 154 either in the passage 142 or at the inlet to the fore-and-aft leveling cylinder 104. Preferably, a fixed control orifice is employed so as to maintain a constant predetermined pressure within the passage 142.

Referring now to FIG. 5, an alternative control circuit is shown for the disk harrow 10. In this embodiment, a reservoir 155 is connected to a pump 156 which is capable of pressurizing the fluid and routing it to a flow controller 160. The flow controller 160, preferably a four-way, three position control valve is actuated by movement of a control lever 158. Fluid passing through the flow controller 160 is directed to two sources. Part of the fluid flows into a flow divider 162, such as a flow divider-combiner, which is capable of dividing the fluid flow into two equal volumes irrespective of the pressure differentials in connecting passages 184 and 188. The presence of equal fluid volumes in the passages 184 and 188 will assure that wheel lift cylinders 164, 166, 168 and 170 will all operate at the same rate, that is, the piston within these cylinders will move at the same velocity. The remainder of the fluid flow from the flow controller 160 is directed through a passage 190 and a check valve 178 to a fore-and-aft leveling cylinder 172. As discussed above in referring to FIG. 4, an orifice 182, preferably a fixed orifice, is positioned across the passage 190 and serves to orifice the flow so that the piston within the fore-and-aft leveling cylinder 172 will move at the same velocity as the pistons in the wheel lift cylinders 164–170.

The control system also includes two additional check valves 174 and 176 which are positioned across the passages 184 and 188, and which connect the flow divider 162 to the wheel lift cylinders 166 and 168. The purpose of the check valves 174 and 176, as well as the check valve 178 located across passage 190, is to permit fluid flow only in one direction. The check valves 174–178 are pressure activated to an open position from a normally closed position. However, the check valves 174–178 will permit a reverse flow of fluid through the passages 184, 188 and 190, respectively, when fluid pressure in a connectible pilot line 180 exceeds a predetermined value. The occurance of such pressure valves will be explained shortly.

In FIG. 5, the top two wheel lift cylinders 164 and 166 are connected in series by a passage 186 as are the bottom two wheel lift cylinders 168 and 170 by a passage 189. This series configuration permits simultaneous movement of the pistons within all the cylinders so that the disk harrow frame can be raised or lowered while in a horizontal plane. And lastly, three passages 192, 194 and 196 connect the wheel lift cylinders 164 and 170 and the fore-and-aft leveling cylinder 172 back to the reservoir 155 via the flow controller 160.

As the control lever 158 is moved in an opposite direction, the flow controller 160 is shifted to a position wherein fluid flow is reversed, that is, it is directed to the opposite ends of the double acting wheel lift cylinders 164–170 and the fore-and-aft leveling cylinder 172. As the flow controller 160 assumes this new position, a pressure surge from the pump 156 is sensed by the pilot line 180 and the check valves 174–178 are opened. This opening of the check valves 174–178 allows the pistons in the cylinders 164–172 to move in a reverse direction and force the fluid on their left side back through the flow divider 162 and the flow controller 160 to the reservoir 155.

OPERATION

Starting with the disk harrow 10 sitting on the ground so that the disks 56 contact the ground surface, the control circuit shown in FIG. 5 would operate as follows. Upon moving the control lever 158 in one direction, the flow controller 160 is activated so that pressurized fluid from the pump 156 would flow through the flow controller 160. This pressurized fluid would then be divided into two portions, one portion flowing into the passage 190 and the other portion flowing into the flow divider 162. The flow dividing means 162 can be a conventional flow divider-combiner that divides the flow into equal volumes irrespective of the pressure differentials in the passages 184 or 188. This assures that the pistons in the wheel lift cylinders 166 and 168 will move at the same velocity. As the pistons within the wheel cylinders 166 and 168 start to move, they force pressurized fluid out through the passages 186 and 189, respectively, into the wheel lift cylinders 164 and 170, respectively.

The simultaneous extension of the pistons in the wheel lift cylinders 164, 166, 168 and 170 will cause the wheel modules 60 to come in contact with the ground and raise the frame up to the transport position as shown in FIG. 2. At the same time as this is occurring, the pressurized fluid in the passage 190 will flow through the check valve 178 and the orifice 182 to the fore-and-aft leveling cylinder 172. Again the orifice 182 allows the piston in the fore-and-aft leveling cylinder to move at the same velocity as the pistons in the wheel lift cylinders 164, 166, 168 and 170. The entering fluid causes the fore-and-aft leveling cylinder 172 to extend so that the first support arm 102 is pivoted towards the front of the frame 12, thus causing the turnbuckle 124 to assume an upright position. This upright positioning of the turnbuckle 124 will assure a stable position for the frame 12 while the disk harrow 10 is in the transport mode.

To lower the disk harrow 10 to its working position, the control lever 158 would be moved in the opposite direction. This movement will cause the flow controller 160 to direct the fluid flow in an opposite direction through the passages 192, 194 and 196. Any pressure surged through the passages 192, 194 and 196 will be sensed by the pilot line 180 which connects with the passages 184, 188 and 190 via the check valves 174, 176 and 178. The check valves 174, 176 and 178 are constructed to allow fluid flow in only one direction so that a predetermined system pressure can be maintained. When a pressure surge is sensed in the pilot line 180, the check valve 174, 176 and 178 will be opened so that a reverse fluid flow through the passages 184, 188 and 190 is possible.

As the pistons within the wheel lift cylinders 164, 166, 168 and 170 move to the left, the wheel modules 60 will be raised upwards off the ground and the frame 12 will be lowered with respect to the ground. Simultaneously, the piston within the fore-and-aft leveling cylinder 172 will be retracted, thereby causing the first support arm 102 to move rearward with respect to the frame 12. This action will cause the turnbuckle 124 to move through an arcuate path to a more inclined position retaining the frame 12 in a substantially parallel position with respect to the ground.

One of the benefits of this improved leveling system is that on-the-go adjustments can be made during the working operation by simply moving the control lever 158.

While the invention has been described in conjunction with specific embodiments, it is to be understood that many alternatives, modifications and variations will be apparent to those skilled in the art in light of the aforegoing description. Accordingly, this invention is intended to embrace all such alternatives, modifications and variations which fall within the spirit and scope of the appended claims.

I claim:

1. A wheeled implement including a leveling system, said implement having a frame adapted to support ground-engaging tools, a hitch structure pivotally connected to said frame for movement about a transverse axis and extending forwardly to a forward end connectible to a traction vehicle, and support wheels mounted on said frame and movable between transport and working positions, said leveling system comprising:
    (a) power means for raising and lowering said support wheels, said power means including at least two wheel lift cylinders connected to parallel;
    (b) fore-and-aft leveling means for stabilizing said frame during transport and for maintaining said frame substantially parallel to the ground during both transport and working positions, said fore-and-aft leveling means including a first support arm pivotally attached at one end to a front portion of said frame, a second support arm securely attached to a point on said frame rearward of said first support arm, a hydraulic cylinder attached to said first support arm and being coaxially aligned with a spring assembly which is attached to said second support arm, said hydraulic cylinder being connected in parallel with said wheel lift cylinders to retain said frame substantially parallel to the ground during movement of said frame between said transport and working positions and to hold said frame stable during transport, and said spring assembly cooperating with said hydraulic cylinder to permit flexible movement of said frame while said implement traverses over uneven ground;
    (c) a mechanical link connected between said first support arm and said hitch structure for angularly retaining said hitch structure relative to said front portion of said frame to accommodate a drawbar hitch which can be positioned at various heights on said traction vehicle;
    (d) fluid supply means for supplying pressurized fluid to said wheel lift cylinders and to said fore-and-aft hydraulic leveling cylinder; and
    (e) flow dividing means for dividing the volume of said pressurized fluid equally between said wheel lift cylinders and said fore-and-aft hydraulic leveling cylinder such that said frame can be raised and lowered with respect to the ground in a substantially horizontal fashion.

2. A wheeled implement including a leveling system, said implement having a frame adapted to support ground-engaging tools, a hitch structure pivotally connected to said frame for movement about a transverse axis and extending forwardly to a forward end connectible to a traction vehicle, and support wheels mounted on said frame and movable between transport and working positions, said leveling system comprising:
    (a) power means for raising and lowering said support wheels, said power means including at least two wheel lift cylinders connected in parallel;
    (b) fore-and-aft leveling means for stabilizing said frame during transport and for maintaining said frame substantially parallel to the ground during both transport and working positions, said fore-and-aft leveling means including a first support arm pivotally attached at one end to a front portion of said frame, a second support arm securely attached to a point on said frame rearward of said first support arm, a hydraulic cylinder coaxially aligned with a spring assembly, said hydraulic cylinder being pivotally attached at one end to said first support arm and having a cylinder rod extending out of an opposite end which extends into said spring assembly, said spring assembly being pivotally attached to said second support arm such that said hydraulic cylinder and said spring assembly cooperate to permit flexible movement of said frame while said implement traverses over uneven terrain;
    (c) a mechanical link connected between said first support arm and said hitch structure for angularly retaining said hitch structure relative to said front portion of said frame to accommodate a drawbar hitch which can be positioned at various heights on said traction vehicles;
    (d) fluid supply means for supplying pressurized fluid to said wheel lift-cylinders and to said fore-and-aft hydraulic leveling cylinder; and
    (e) flow dividing means for dividing the volume of said pressurized fluid equally between said wheel lift cylinders and said fore-and-aft hydraulic leveling cylinder such that said frame can be raised and lowered with respect to the ground in a substantially horizontal fashion.

3. The leveling system of claim 2 wherein a stop is secured to said frame to limit the forward motion of said first support arm.

4. The leveling system of claim 2 wherein said mechanical link is connected between a central portion of said first support arm and said hitch structure and estabilishes a relatively small moment with respect to said first support arm as compared with said moment established by said fore-and-aft leveling means with respect to said first support arm when said implement is in transport.

5. The leveling system of claim 2 wherein said hydraulic leveling cylinder includes a piston which moves at approximately the same velocity as pistons within said wheel lift cylinders to maintain said frame substantially parallel to the ground.

6. The leveling system of claim 2 wherein said fluid supply means includes a fluid reservoir, a pump connected to said reservoir for pressurizing said fluid, a fluid passage connecting said pump to both said flow dividing means and to said hydraulic leveling cylinder, a flow controller connected across said fluid passage for regulating movement of said fluid from said pump to both said wheel lift cylinders and to said hydraulic leveling cylinder, and a single control lever connected to said flow controller for operating the movement of said flow controller.

7. The leveling system of claim 2 wherein said flow dividing means is a flow divider-combiner capable of dividing incoming fluid flow into two or more equal volumes regardless of fluid pressure.

8. The leveling system of claim 2 wherein said wheel lift cylinders and said hydraulic leveling cylinder have equal internal diameters.

9. A wheeled implement including a leveling system, said implement having a flexible three-piece frame adapted to support ground-engaging tools, a hitch structure pivotally connected to said frame for movement about a transverse axis and extending forwardly to a forward end connectible to a traction vehicle, and support wheels mounted on said frame and moveable between transport and working positions, said leveling system comprising:
(a) four wheel lift cylinders attached to said frame for raising and lowering said support wheels;
(b) fore-and-aft leveling means for stabilizing said frame during transport and for maintaining said frame substantially parallel to the ground during both transport and working positions, said fore-and-aft leveling means being located approximately in the middle of said three-piece frame and in a forward portion thereof, said leveling means including a first support arm pivotally attached at one end to a front portion of said frame, a second support arm securely attached to a point on said frame rearward of said first support arm, a hydraulic cylinder attached to said first support arm and being coaxially aligned with a spring assembly which is attached to said second support arm, said hydraulic cylinder being connected in parallel with at least two of said wheel lift cylinders to retain said frame substantially parallel to the ground during movement of said frame between said transport and working positions and to hold said frame stable during transport, and said spring assembly cooperating with said hydraulic cylinder to permit flexible movement of said frame while said implement traverses over uneven terrain;
(c) a mechanical link connected between said first support arm and said hitch structure for angularly retaining said hitch structure relative to said front portion of said frame to accommodate a drawbar hitch positioned at various heights on said traction vehicle;
(d) fluid supply means for supplying pressurized fluid to said wheel lift cylinders and to said fore-and-aft hydraulic leveling cylinder; and
(e) flow dividing means for dividing the volume of said pressurized fluid equally between said wheel lift cylinders and said fore-and-aft hydraulic leveling cylinder such that said frame can be raised and lowered with respect to the ground in a substantially horizontal fashion.

10. The leveling system of claim 9 wherein two of said wheel lift cylinders are positioned on each side of said fore-and-aft leveling means.

11. The leveling system of claim 10 wherein said two wheel cylinders located on each side of said fore-and-aft leveling means are fluidly connected together in series to facilitate simultaneous movement of the outer sections of said three-piece frame.

12. The leveling system of claim 9 wherein a stop is secured to said frame to limit the forward motion of said first support arm.

13. The leveling system of claim 9 wherein said mechanical link is connected between a central portion of said first support arm and said hitch structure and establishes a relatively small moment with respect to said first support arm as compared with said moment established by said fore-and-aft leveling means with respect to said first support arm when said implement is in transport.

14. The leveling system of claim 9 wherein said hydraulic leveling cylinder includes a piston which moves at approximately the same velocity as pistons within said wheel lift cylinders to maintain said frame substantially parallel to the ground.

15. The leveling system of claim 9 wherein said fluid supply means includes a fluid reservoir, a pump connected to said reservoir for pressurizing said fluid, a fluid passage connecting said pump to both said flow dividing means and to said hydraulic leveling cylinder, a return passage connecting said wheel lift cylinders and said hydraulic leveling cylinder to said reservoir, a flow controller connected across said fluid passage and said return passage for regulating movement of said fluid to and from said wheel lift cylinders and said hydraulic leveling cylinder, an orifice located across said fluid passage immediate said inlet to said hydraulic leveling cylinder for regulating fluid flow into said hydraulic leveling cylinder such that the velocity of a piston within said hydraulic leveling cylinder is equal to the velocity of each piston within said wheel lift cylinders, and a manually operable control lever connected to said flow controller for controlling the movement of said flow controller.

16. The leveling system of claim 9 wherein said flow dividing means is a flow divider-combiner capable of dividing incoming fluid flow into two or more equal volumes regardless of fluid pressure.

17. The leveling system of claim 9 wherein said wheel lift cylinders and said hydraulic leveling cylinder have equal internal diameters.

* * * * *

UNITED STATES PATENT AND TRADEMARK OFFICE
CERTIFICATE OF CORRECTION

PATENT NO. : 4,379,491
DATED : 12 April 1983
INVENTOR(S) : Paul R. Riewerts; Stephen M. Hillman It is certified that error appears in the above-identified patent and that said Letters Patent is hereby corrected as shown below:

Column 7, line 60, delete "to" and insert -- in --.

Column 9, line 11, delete "tabilishes" and insert -- tablishes --.

Signed and Sealed this

Twenty-second Day of November 1983

[SEAL]

Attest:

GERALD J. MOSSINGHOFF

Attesting Officer    Commissioner of Patents and Trademarks